(12) United States Patent
Nam et al.

(10) Patent No.: US 10,376,871 B2
(45) Date of Patent: Aug. 13, 2019

(54) DEVICE FOR PURIFYING EXHAUST GAS

(71) Applicants: Hyundai Motor Company, Seoul (KR); Kia Motors Corporation, Seoul (KR)

(72) Inventors: Yoon Sang Nam, Gunpo-si (KR); Hyokyung Lee, Anyang-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 53 days.

(21) Appl. No.: 15/653,870

(22) Filed: Jul. 19, 2017

(65) Prior Publication Data

US 2018/0133707 A1 May 17, 2018

(30) Foreign Application Priority Data

Nov. 16, 2016 (KR) .......................... 10-2016-0152652

(51) Int. Cl.
*B01J 37/02* (2006.01)
*F01N 3/035* (2006.01)
(Continued)

(52) U.S. Cl.
CPC .......... *B01J 37/0246* (2013.01); *F01N 3/035* (2013.01); *F01N 3/0814* (2013.01); *F01N 3/0842* (2013.01); *F01N 3/0871* (2013.01); *F01N 3/101* (2013.01); *F01N 9/00* (2013.01); *F01N 13/009* (2014.06); *B01D 2255/00* (2013.01); *F01N 2370/04* (2013.01); *F01N 2510/063* (2013.01);
(Continued)

(58) Field of Classification Search
USPC .................. 60/274, 276, 285, 295, 297, 301
See application file for complete search history.

(56) References Cited

U.S. PATENT DOCUMENTS 5,473,887 A * 12/1995 Takeshima ............ F01N 3/0842
60/276
5,727,385 A * 3/1998 Hepburn ............ B01D 53/9418
423/213.7
(Continued)

FOREIGN PATENT DOCUMENTS

GB      2511178 A    8/2014
JP      11-223123 A  8/1999
(Continued)

OTHER PUBLICATIONS

European Search Report dated Dec. 21, 2017 for European Patent Application No. 17181155.7.

*Primary Examiner* — Binh Q Tran
(74) *Attorney, Agent, or Firm* — Morgan, Lewis & Bockius LLP

(57) ABSTRACT

A device for purifying exhaust gas provided to purify exhaust gas in an engine, may include an exhaust line through which exhaust gas discharged from the engine passes, a NOx storage catalyst that is installed in the exhaust line to absorb a nitrogen oxide discharged from the exhaust gas, and detach an absorbed nitrogen oxide when a temperature of a catalyst is higher than a predetermined value, and a three way catalyst (TWC) arranged in rear of the NOx storage catalyst for reducing the nitrogen oxide detached from the NOx storage catalyst, wherein the NOx storage catalyst includes an LTA zeolite catalyst.

13 Claims, 6 Drawing Sheets

(51) Int. Cl.
  *F01N 3/08*    (2006.01)
  *F01N 3/10*    (2006.01)
  *F01N 9/00*    (2006.01)
  *F01N 13/00*   (2010.01)

(52) U.S. Cl.
  CPC ....... *F01N 2900/1602* (2013.01); *Y02T 10/22* (2013.01); *Y02T 10/47* (2013.01)

(56) References Cited

U.S. PATENT DOCUMENTS

| | | | |
|---|---|---|---|
| 2006/0053772 A1* | 3/2006 | Dou | F01N 3/0814 60/285 |
| 2006/0168949 A1* | 8/2006 | Xu | B01D 53/9422 60/295 |
| 2010/0101212 A1* | 4/2010 | Iwachido | F01N 3/101 60/274 |
| 2011/0061371 A1 | 3/2011 | Cavataio et al. | |
| 2012/0042636 A1* | 2/2012 | Asanuma | F01N 3/2066 60/287 |

FOREIGN PATENT DOCUMENTS

| | | |
|---|---|---|
| JP | 2007-245050 A | 9/2007 |
| KR | 10-1516499 B1 | 4/2015 |

\* cited by examiner

DEVICE FOR PURIFYING EXHAUST GAS

CROSS-REFERENCE TO RELATED APPLICATION

The present application claims priority to Korean Patent Application No. 10-2016-0152652, filed Nov. 16, 2016, the entire contents of which is incorporated herein for all purposes by this reference.

BACKGROUND OF THE INVENTION

Field of the Invention

The present invention relates to a device for purifying exhaust gas, and more particularly, to a device for purifying exhaust gas capable of reducing harmful materials in exhaust gas by using a Linde Type A (LTA) zeolite catalyst with improved high-temperature performance.

Description of Related Art

In general, the exhaust gas is a mixed gas that is combusted from an engine and discharged into the atmosphere through the exhaust pipe, the exhaust gas includes noxious materials, for example, carbon monoxide (CO), nitrogen oxide (NOx), unburned hydrocarbon (HC).

A device for purifying exhaust gas may include a three way catalyst (TWC) and nitrogen oxide storage catalyst, and purifies the nitrogen oxide in the exhaust gas by controlling the fuel injection.

When the air-fuel ratio supplied in the engine is a theoretical air-fuel ratio, the three way catalyst converts the noxious materials included in the exhaust gas into harmless materials.

In addition, the nitrogen oxide storage catalyst absorbs the nitrogen oxide of the exhaust gas in the lean state, and exhausts by detaching the absorbed nitrogen oxide and reduction with a nitrogen gas in the rich state.

However, the conventional device for purifying exhaust gas is disposed at the rear of the nitrogen oxide storage catalyst due to weak high-temperature durability, therefore even though the exhaust gas is controlled in the rich state, nitrogen oxide purification efficiency is decreased.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a device for purifying exhaust gas having advantages of improving exhaust gas purification performance, by applying an LTA zeolite catalyst to a NOx storage catalyst.

Various aspects of the present invention are directed to providing a device for purifying exhaust gas provided to purify exhaust gas in an engine. The device can include: an exhaust line through which exhaust gas discharged from the engine passes, a NOx storage catalyst that is installed in the exhaust line to absorb a nitrogen oxide discharged from the exhaust gas, and detach an absorbed nitrogen oxide when the temperature of the catalyst is higher than a predetermined value, and a three way catalyst (TWC) arranged in rear of the nitrogen oxide (NOx) storage catalyst for reducing the nitrogen oxide detached from the NOx storage catalyst, wherein the NOx storage catalyst includes a Linde Type A (LTA) zeolite catalyst.

The device may further include a controller that is configured to activate an absorption of the nitrogen oxide in the NOx storage catalyst by increasing a temperature of the exhaust gas in cold start, and control the exhaust gas in a rich condition when the temperature of the NOx storage catalyst is higher than the predetermined value.

The controller may control the exhaust gas in the rich condition by using a lambda signal of a lambda sensor when the temperature of the NOx storage catalyst is higher than the predetermined value.

The controller may model the temperature of the exhaust gas according to a change of an engine driving variable, and determine the temperature of the exhaust gas and the temperature of the NOx storage catalyst in consideration of a distance from an exhaust valve of the engine and a thermal capacity.

The engine driving variable may include at least one of a RPM of the engine, a fuel amount, an air amount, a lambda value of the exhaust gas, a flow rate of the exhaust gas, and an ignition timing.

The controller may increase the temperature of the exhaust gas by increasing a RPM of the engine in the cold start.

The LTA zeolite catalyst may include at least one of platinum (Pt), palladium (Pd), rhodium (Rh), iron (Fe), copper (Cu), silver (Ag), manganese (Mn), cobalt (Co) and magnesium (Mg).

When the LTA zeolite catalyst may include the Pd, the content of Pd may be about 0.1 wt % to about 3 wt % with respect to the entire weight of the LTA zeolite catalyst.

Various aspects of the present invention are directed to providing a method for purifying an exhaust gas in an engine by a device for purifying exhaust gas, the method can include: measuring a temperature of the exhaust gas and a temperature of a NOx storage catalyst, increasing the temperature of the exhaust gas to absorb a nitrogen oxide in the NOx storage catalyst, and controlling the exhaust gas in a rich condition when the temperature of the NOx storage catalyst is higher than a predetermined value.

The NOx storage catalyst may include an LTA zeolite catalyst, and the LTA zeolite catalyst may include at least one of Pt, Pd, Rh, Fe, Cu, Ag, Mn, Co and Mg.

When the LTA zeolite catalyst includes palladium or Pd, the content of Pd may be about 0.1 wt % to about 3 wt % with respect to the entire weight of the LTA zeolite catalyst.

The measuring the temperature may include modeling the temperature of the exhaust gas according to a change of an engine driving variable, and determining the temperature of the exhaust gas and the temperature of the NOx storage catalyst in consideration of a distance from an exhaust valve of the engine and a thermal capacity.

The engine driving variable may include at least one of a RPM of the engine, a fuel amount, an air amount, a lambda value of the exhaust gas, a flow rate of the exhaust gas, and an ignition timing.

The increasing the temperature of the exhaust gas may include increasing the temperature of the exhaust gas by increasing a RPM of the engine in the cold start, and activating an absorption of the nitrogen oxide in the NOx storage catalyst.

The controlling the exhaust gas in the rich condition may control a lambda value detected from a lambda sensor to be smaller than 1, and purify the nitrogen oxide detached from the NOx storage catalyst by a three way catalyst (TWC) arranged in rear of the NOx storage catalyst.

According to the exemplary embodiment of the present invention, the LTA zeolite catalyst with improved high temperature performance is applied to the NOx storage catalyst, and the three way catalyst is disposed in rear of the NOx storage catalyst, and thus it is possible to provide an environment that can improve the purification performance of nitrogen oxide and improve fuel economy.

Further, the absorption of the nitrogen oxide is activated by increasing a temperature of the exhaust gas in the cold start when a larger amount of the NOx is produced, the exhaust gas is controlled in the rich condition and the reducing agent is supplied when the temperature reaches the temperature at which NOx is detached, and thus it is possible to provide an environment that can improve the purification performance of nitrogen oxide and improve fuel economy.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
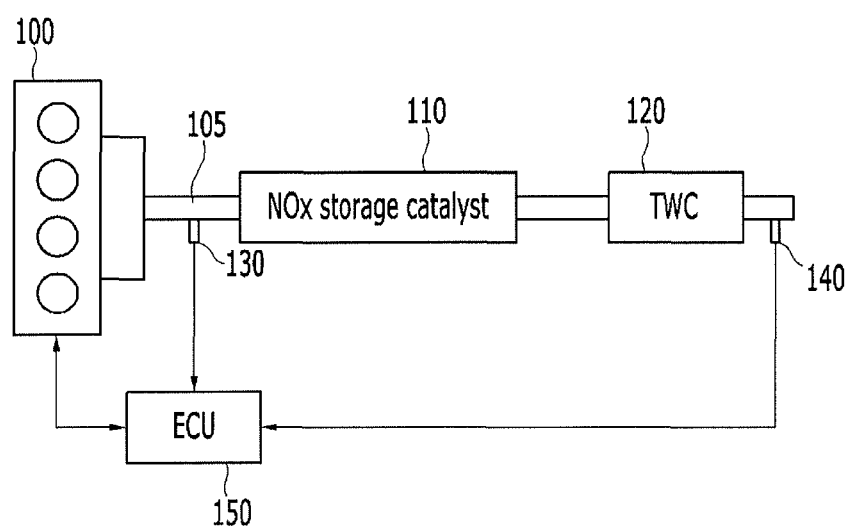
FIG. 1 is a diagram schematically illustrating a structure of a device for purifying exhaust gas according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which Care illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

A device for purifying exhaust gas according to an exemplary embodiment of the present invention may be applied to not only vehicles but also various devices which burn fossil fuels to obtain energy and emit gas generated in the process to the air. In the present specification, it is exemplified that the device for purifying exhaust gas is applied to the vehicles, but it should not be interpreted that the device for purifying exhaust gas is applied to only the vehicles.

An engine for generating power is mounted on the vehicle. The engine converts chemical energy into mechanical energy by burning a mixture of fuel and air. The engine is connected to an intake manifold to receive air into a combustion chamber and connected to an exhaust manifold to collect the exhaust gas generated in the combustion process in the exhaust manifold and discharge the collected exhaust gas to the outside of the vehicle. In the combustion chamber or the intake manifold, an injector is mounted to inject the fuel into the combustion chamber or the intake manifold.

The exhaust gas generated in the engine is discharged to the outside of the vehicle through the exhaust gas. The exhaust device may include an exhaust pipe and an exhaust gas recirculation (EGR) device.

The exhaust pipe is connected to the exhaust manifold to discharge the exhaust gas to the outside of the vehicle.

The EGR device is mounted on the exhaust pipe and the exhaust gas discharged in the engine passes through the EGR device. Further, the EGR device is connected to the intake manifold to control a combustion temperature by mixing a part of the exhaust gas with the air. The combustion temperature may be adjusted by controlling on/off of an EGR valve (not illustrated) provided in the EGR device. That is, an amount of the exhaust gas supplied to the intake manifold is adjusted by controlling on/off of the EGR valve.

The exhaust device may further include a particulate filter that is mounted on the exhaust pipe to collect a particulate material contained in the exhaust gas. The particulate filter may be a device for purifying exhaust gas according to the exemplary embodiment of the present invention for purifying a harmful material other than the particulate material contained in the exhaust gas.

Hereinafter, the device for purifying exhaust gas according to the exemplary embodiment of the present invention will be described in detail with reference to the accompanying drawings.

FIG. 1 is a diagram schematically illustrating a structure of a device for purifying exhaust gas according to an exemplary embodiment of the present invention. In this case, in the device for purifying exhaust gas, only schematic configurations required for description according to the exemplary embodiment of the present invention are illustrated and the present invention is not limited to the configurations.

Referring to FIG. 1, the device for purifying exhaust gas according to the first exemplary embodiment of the present invention includes an exhaust line 105 through which exhaust gas discharged from an engine 100 passes, a NOx storage catalyst 110 installed on the exhaust line 105, a three way catalyst (TWC) 120 arranged in rear of the NOx storage catalyst 110, lambda sensors 130 and 140 which detect an oxygen concentration included in the exhaust gas discharged from an engine 100 passes, and a controller which controls absorption and desorption of the nitrogen oxide in the NOx storage catalyst 110 and controls the exhaust gas in a rich condition according to the temperature of the NOx storage catalyst 110.

The NOx storage catalyst 110 absorbs a nitrogen oxide discharged from the exhaust gas, and detaches an absorbed nitrogen oxide when a temperature of a catalyst is higher than a predetermined value. The three way catalyst 120 may reduce the nitrogen oxide detached from the NOx storage catalyst 110.

The controller 150 activates the absorption of the nitrogen oxide in the NOx storage catalyst by increasing a temperature of the exhaust gas in cold start, and controls the exhaust gas in a rich condition when the temperature of the NOx storage catalyst 110 is higher than the predetermined value to easy reaction of the nitrogen oxide.

The controller 150 may model the temperature of the exhaust gas according to a change of an engine driving variable, and determine the temperature of the exhaust gas and the temperature of the NOx storage catalyst 110 in consideration of a distance from an exhaust valve of the engine and a thermal capacity. Herein, the engine driving variable includes at least one of a RPM of the engine, a fuel amount, an air amount, a lambda value of the exhaust gas, a flow rate of the exhaust gas, and an ignition timing.

The controller 150 may increase the temperature of the exhaust gas by increasing a RPM of the engine 100 in the cold start or retarding the ignition timing of the engine 100.

When the temperature of the NOx storage catalyst 110 arrives at a NOx detaching start temperature, the controller 150 may control the exhaust gas in the rich condition by using a lambda signal detected by the lambda sensors 130 and 140. In addition, the controller 150 controls a lambda value detected from the lambda sensors 130 and 140 to be smaller than 1, and purifies the nitrogen oxide detached from the NOx storage catalyst 110 by a three way catalyst 120.

For this purpose, the controller 150 may be implemented by one or more processors operated by a predetermined program, and the predetermined program may be programmed to perform respective steps of the method for purifying exhaust gas according to the exemplary embodiment of the present invention.

In addition, the NOx storage catalyst 110 may include a LTA zeolite catalyst with improved high-temperature performance according to an exemplary embodiment of the present invention. The LTA zeolite catalyst may include at least one of platinum (Pt), palladium (Pd), rhodium (Rh), iron (Fe), copper (Cu), silver (Ag), manganese (Mn), cobalt (Co) and magnesium (Mg). Further, when the LTA zeolite catalyst includes the Pd, the content of Pd may be about 0.1 wt % to about 3 wt % with respect to the entire weight of the LTA zeolite catalyst.

Hereinafter, a process of manufacturing the LTA zeolite catalyst according to the exemplary embodiment of the present invention will be described.

A method for manufacturing the catalyst according to an exemplary embodiment of the present invention includes preparing LTA zeolite having a Si/Al (silicon/aluminum) ratio of more than 1 (e.g., 1.5, 2, 3, 4, 5, 6, 7, 8, 9, 10, 15, 20, 25, 30, 35, 40, 45, 50, or more), preparing LTA zeolite containing ions by substituting ions in the LTA zeolite for ions, and preparing copper type LTA zeolite by performing copper (Cu) ion exchange of the LTA zeolite containing ions, and a ratio of copper and aluminum is about 0.14 to about 0.58 (e.g., about 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, or about 0.58). However, the present invention is not limited thereto and a ratio of active metal and aluminum may be adjusted according to a use environment of the catalyst.

First, the preparing of the LTA zeolite will be described. The LTA zeolite may be prepared by using seed and also prepared without using the seed. A Si/Al ratio of the LTA zeolite prepared in this process may be more than 1. More particularly, the Si/Al ratio may be 5 to 50, e.g., 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50. In some embodiments, the Si/Al ratio may be 5 to 30, e.g., 5, 6, 7, 8, 9, 10, 11, 12, 13, 14, 15, 16, 17, 18, 19, 20, 21, 22, 23, 24, 25, 26, 27, 28, 29, or 30. In other embodiments, the Si/Al ratio may be 8 or more, e.g., 8, 9, 10, 11, 12, 13, 14, 15, 16, 117, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, or more.

As an example, the process of preparing the LTA zeolite by using the seed will be described.

In order to prepare the LTA zeolite, first, the LTA zeolite may be prepared by mixing an LTA seed with a mixture of aluminum hydroxide ($Al(OH)_3$) and tetraethyl orthosilicate ($Si(OC_2H_5)_4$).

Particularly, a first mixture is prepared by mixing a 1,2-dimethyl-3-(4-methylbenzyl)imidazolium hydroxide aqueous solution and aluminum hydroxide ($Al(OH)_3$) and performing primary stirring, and additionally mixing tetramethylammonium hydroxide pentahydrate and performing secondary stirring.

Herein, the first mixture may be prepared by mixing about 20 wt % to about 35 wt % (e.g., about 20 wt %, about 21 wt %, about 22 wt %, about 23 wt %, about 24 wt %, about 25 wt %, about 26 wt %, about 27 wt %, about 28 wt %, about 29 wt %, about 30 wt %, about 31 wt %, about 32 wt %, about 33 wt %, about 34 wt %, or about 35 wt %) of 1,2-dimethyl-3-(4-methylbenzyl)imidazolium hydroxide, about 1 wt % to about 2 wt % (e.g., about 1 wt % or about 2 wt %) of aluminum hydroxide, about 1 wt % to about 5 wt % (e.g., about 1 wt %, about 2 wt %, about 3 wt %, about 4 wt %, or about 5 wt %) of tetramethylammonium hydroxide pentahydrate, and a residue amount of water with respect to a total weight of the first mixture, and the primary stirring and the secondary stirring may be performed for 0.5 hr to 1.5 hrs (e.g., about 0.5 hrs, about 1.0 hrs, or about 1.5 hrs).

A second mixture is prepared by mixing tetraethyl orthosilicate ($Si(OC_2H_5)_4$; TEOS) with the prepared first mixture and performing tertiary stirring and then mixing a LTA seed and performing quaternary stirring.

The tetraethyl orthosilicate (TEOS) may be mixed with about 30 wt % to about 35 wt % (e.g., about 30 wt %, about 31 wt %, about 32 wt %, about 33 wt %, about 34 wt %, or about 35 wt %) with respect to a total weight of the second mixture may be mixed and the LTA seed may be mixed with about 2 wt % to about 6 wt % (e.g., about 2 wt %, about 3 wt %, about 4 wt %, about 5 wt %, or about 6 wt %) with respect to a total weight of all silicon ingredients included in the LTA zeolite.

Further, the tertiary stirring may be performed for about 2 hrs to about 4 hrs (e.g., about 2 hrs, about 3 hrs, or about 4 hrs) and the quaternary stirring may be performed for about 20 hrs to about 28 hrs (e.g., about 20 hrs, about 21 hrs, about 22 hrs, about 23 hrs, about 24 hrs, about 25 hrs, about 26 hrs, about 27 hrs, or 28 hrs).

Thereafter, a third mixture is prepared by sufficiently heating the second mixture to evaporate ethanol and water generated due to hydrolysis of tetraethyl orthosilicate (TEOS).

The heating of the second mixture may be performed at a temperature of about 70° C. to about 90° C. (e.g., about 70° C., about 71° C., about 72° C., about 73° C., about 74° C., about 75° C., about 76° C., about 77° C., about 78° C., about 79° C., about 80° C., about 81° C., about 82° C., about 83° C., about 84° C., about 85° C., about 86° C., about 87° C., about 88° C., about 89° C., or about 90° C.).

Thereafter, a fourth mixture is prepared by mixing a hydrogen fluoride (HF) aqueous solution with the third mixture and performing heating, washing, and drying processes.

Herein, the heating of the third mixture may be performed at a temperature of about 150° C. to about 200° C. (e.g., about 150° C., about 151° C., about 152° C., about 153° C., about 154° C., about 155° C., about 156° C., about 157° C., about 158° C., about 159° C., about 160° C., about 161° C., about 162° C., about 163° C., about 164° C., about 165° C., about 166° C., about 167° C., about 168° C., about 169° C., about 170° C., about 171° C., about 172° C., about 173° C., about 174° C., about 175° C., about 176° C., about 177° C., about 178° C., about 179° C., about 180° C., about 181° C., about 182° C., about 183° C., about 184° C., about 185° C., about 186° C., about 187° C., about 188° C., about 189° C., about 190° C., about 191° C., about 192° C., about 193° C., about 194° C., about 195° C., about 196° C., about 197° C., about 198° C., about 199° C., or about 200° C.) for a predetermined time and the washing may be performed several times, and the drying may be performed at room temperature.

Next, the LTA zeolite for preparing the zeolite catalyst according to the exemplary embodiment of the present invention is prepared by performing additional heat treatment for removing an organic material of the fourth mixture.

The additional heat treatment may be performed at about 500° C. to about 700° C. (e.g., about 500° C., about 550° C., about 600° C., about 650° C., or about 700° C.) for 6 to 10 hrs (e.g., about 6 hrs, about 7 hrs, about 8 hrs, about 9 hrs, or about 10 hrs) and in the LTA zeolite according to the exemplary embodiment, the Si/Al ratio may be 5 to 50 (e.g., 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50).

Further, in the case of preparing the LTA zeolite without the seed, the LTA zeolite may be prepared by the following method. 0.0 mole to 0.2 mole (e.g., 0.0 mole, 0.1 mole, or 0.2 mole) of aluminum hydroxide and 0.0 mole to 0.2 mole of tetramethylammonium hydroxide (hereinafter, TMAOH) are added with 0.1 mole to 1.0 mole (e.g., 0.1 mole, 0.2 mole, 0.3 mole, 0.4 mole, 0.5 mole, 0.6 mole, 0.7 mole, 0.8 mole, 0.9 mole, or 1.0 mole) of 1,2-dimethyl-3-(4-methylbenzyl)imidazolium hydroxide (hereinafter, 12DM3 (4MB) IOH) as an organic structure-induced molecule and sufficiently stirred in a plastic beaker. Next, tetraethyl orthosilicate (hereinafter, TEOS) is added to have a ratio of 1 mole with respect to the reactants and sufficiently stirred again.

Next, the solution is sufficiently heated at about 60° C. to about 100° C. until water becomes 0 mole to 10 moles (e.g., 0 mole, 2 mole, 3 mole, 4 mole, 5 mole, 6 mole, 7 mole, 8 mole, 9 mole, or 10 mole) while completely removing ethanol generated due to the hydrolysis of TEOS added to the solution. Finally, 0.1 mole to 1.0 mole (e.g., 0.1 mole, 0.2 mole, 0.3 mole, 0.4 mole, 0.5 mole, 0.6 mole, 0.7 mole, 0.8 mole, 0.9 mole, or 1.0 mole) of hydrogen fluoride (HF) is added and sufficiently mixed to obtain a reaction mixture having a desired composition.

The reaction mixture is transferred to a Teflon reactor and put in a container made of stainless steel again, heated at 100° C. to 200° C. (e.g., about 100° C., about 110° C., about 120° C., about 130° C., about 140° C., about 150° C., about 160° C., about 170° C., about 180° C., about 190° C., or about 200° C.) for about 0.1 to about 14 days (e.g., about 0.1 day, about 0.2 day, about 0.3 day, about 0.4 day, about 0.5 day, about 0.6 day, about 0.7 day, about 0.8 day, about 0.9 day, about 1 day, about 2 days, about 3 days, about 4 days, about 5 days, about 6 days, about 7 days, about 8 days, about 9 days, about 10 days, about 11 days, about 12 days, about 13 days, or about 14 days) to prepare the LTA zeolite. Even in the LTA zeolite prepared by the method, the Si/Al ratio may be 5 to 50 (e.g., 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50). However, the preparing method is exemplified and is not limited by the aforementioned method.

Next, a process of preparing the LTA zeolite containing ions by using the prepared LTA zeolite will be described in detail.

First, the LTA zeolite is put into an ammonium salt, refluxed, washed, and dried to prepare an $NH_4$ type LTA zeolite containing $NH_4+$ ions.

Herein, the ammonium salt may be ammonium nitrate ($NH_4NO_3$).

The refluxing process may be performed at a temperature of about 60° C. to about 100° C. (e.g., about 60° C., about 70° C., about 80° C., about 90° C., or about 100° C.) for 5 to 7 hrs (e.g., about 5 hrs, about 6 hrs, or about 7 hrs).

In the exemplary embodiment, the ions exemplifies ammonium ions, but are not limited thereto. That is, a use of other ions or ionic salts is also included in the range of the present invention.

Next, a process of preparing the copper type LTA zeolite by performing copper (Cu) ion exchange in the LTA zeolite containing ions will be described. In the copper type LTA zeolite prepared in the process, a ratio of copper and aluminum may be about 0.14 to about 0.58 (e.g., about 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, or about 0.58). In some embodiments, the ratio is 0.32 to 0.48 (e.g., about 0.32, 0.33, 0.34, 0.35, 0.36, 0.37, 0.38, 0.39, 0.40, 0.41, 0.42, 0.43, 0.44, 0.45, 0.46, 0.47, or about 0.48).

However, the present invention is not limited to the ratio and the ratio of copper and aluminum may be about 0.1 to about 0.7 (e.g., about 0.1, 0.2, 0.3, 0.4, 0.5, 0.6, or about 0.7). The ratio of copper and aluminum may be properly adjusted according to an environmental condition to use the catalyst.

Further, when the content of copper is represented by wt %, the content of copper may be about 0.5 wt % to about 5 wt % (e.g., about 0.5 wt %, about 0.6 wt %, about 0.7 wt %, about 0.8 wt %, about 0.9 wt %, about 1.0 wt %, about 1.1 wt %, about 1.2 wt %, about 1.3 wt %, about 1.4 wt %, about 1.5 wt %, about 1.6 wt %, about 1.7 wt %, about 1.8 wt %, about 1.9 wt %, about 2.0 wt %, about 2.1 wt %, about 2.2 wt %, about 2.3 wt %, about 2.4 wt %, about 2.5 wt %, about 2.6 wt %, about 2.7 wt %, about 2.8 wt %, about 2.9 wt %, about 3.0 wt %, about 3.1 wt %, about 3.2 wt %, about 3.3 wt %, about 3.4 wt %, about 3.5 wt %, about 3.6 wt %, about 3.7 wt %, about 3.8 wt %, about 3.9 wt %, about 4.0 wt %, about 4.1 wt %, about 4.2 wt %, about 4.3 wt %, about 4.4 wt %, about 4.5 wt %, about 4.6 wt %, about 4.7 wt %, about 4.8 wt %, about 4.9 wt %, or about 5.0 wt %). Further, in some embodiments, the content of copper may be 2.0 wt % to 3.0 wt % (e.g., about 2.0 wt %, about 2.1 wt %, about 2.2 wt %, about 2.3 wt %, about 2.4 wt %, about 2.5 wt %, about 2.6 wt %, about 2.7 wt %, about 2.8 wt %, about 2.9 wt %, or about 3.0 wt %).

In the above process, copper type LTA zeolite containing Cu ions may be prepared through copper (Cu) ion exchange of $NH_4$ type LTA zeolite containing dried $NH_4+$ ions after preparing.

The copper ion exchange is put in a copper precursor solution such as copper acetate monohydrate, copper nitride, copper nitrate, and copper sulfate and stirring is performed, and then washing and drying processes are performed to prepare the copper type LTA zeolite.

Next, the copper type LTA zeolite may be heat-treated after gradually increasing the temperature in an oven to prepare the catalyst according to the exemplary embodiment of the present invention.

Herein, the heat treatment of the copper type LTA zeolite may be performed for about 1 hrs to about 24 hrs (e.g., about 1 hr, about 2 hrs, about 3 hrs, about 4 hrs, about 5 hrs, about 6 hrs, about 7 hrs, about 8 hrs, about 9 hrs, about 10 hrs, about 11 hrs, about 12 hrs, about 13 hrs, about 14 hrs, about 15 hrs, about 16 hrs, about 17 hrs, about 18 hrs, about 19 hrs, about 20 hrs, about 21 hrs, about 22 hrs, about 23 hrs, or about 24 hrs) after increasing the temperature up to about 400° C. to about 750° C. (e.g. 400° C., 450° C., 500° C., 550° C., 600° C., 650° C., 700° C., or 750° C.) at about 1° C./min to about 30° C./min (e.g., about 1° C./min, about 5° C./min, about 10° C./min, about 15° C./min, about 20° C./min, about 25° C./min, or about 30° C./min).

In the copper type LTA zeolite prepared in the process, a ratio of copper and aluminum may be 0.14 to 0.58 (e.g., 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, or 0.58). In some embodiments, the ratio of copper and aluminum may be 0.32 to 0.48 (e.g., 0.32, 0.33, 0.34, 0.35, 0.36, 0.37, 0.38, 0.39, 0.40, 0.41, 0.42, 0.43, 0.44, 0.45, 0.46, 0.47, or 0.48).

The ratio of copper and aluminum is a ratio having thermal stability and excellent NOx purification performance.

Hereinabove, the Cu/LTA catalyst containing copper ions is described, but the present invention is not limited thereto.

For example, the LTA zeolite catalyst applied to the NOx storage catalyst 110 according to the exemplary embodiment of the present invention may include a Pd/LTA catalyst. In addition, when the content of Pd is represented by wt % with respect to the entire weight of the Pd/LTA catalyst, the content of Pd may be about 0.1 wt % to about 3 wt % (e.g., about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1.0 wt %, about 1.1 wt %, about 1.2 wt %, about 1.3 wt %, about 1.4 wt %, about 1.5 wt %, about 1.6 wt %, about 1.7 wt %, about 1.8 wt %, about 1.9 wt %, about 2.0 wt %, about 2.1 wt %, about 2.2 wt %, about 2.3 wt %, about 2.4 wt %, about 2.5 wt %, about 2.6 wt %, about 2.7 wt %, about 2.8 wt %, about 2.9 wt %, or about 3.0 wt %) with respect to the entire weight of the Pd/LTA catalyst.

Figure 2:
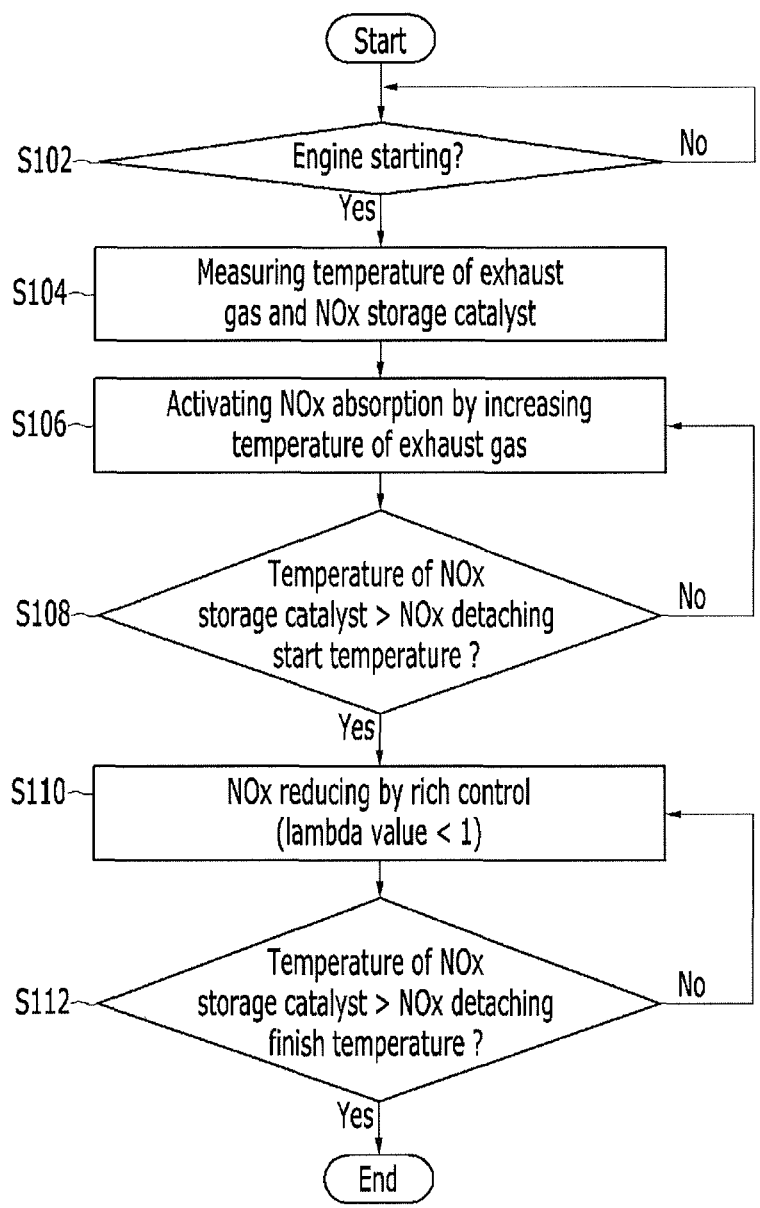
FIG. 2 is a flowchart briefly showing a process of purifying a nitrogen oxide according to an exemplary embodiment of the present invention.

As a result, in the device for purifying exhaust gas according to the exemplary embodiment of the present invention, the LTA catalyst with improved high-temperature performance is applied the nitrogen oxide purification catalyst and the nitrogen oxide purification catalyst is disposed in front of the three way catalyst, thereby improving the nitrogen oxide reduction by activating an absorption of the nitrogen oxide in an initial cold start and easing reaction of the nitrogen oxide at a timing in which the nitrogen oxide is detached FIG. 2 is a flowchart briefly showing a process of purifying a nitrogen oxide according to an exemplary embodiment of the present invention. The following flowchart will be described with the same reference numerals as that of a configuration of FIG. 1.

Referring to FIG. 2, the device for purifying exhaust gas according to an exemplary embodiment of the present invention measures a temperature of the temperature and a temperature of the NOx storage catalyst 110 at steps S102 and S104.

The device for purifying exhaust gas may model the temperature of the exhaust gas according to a change of an engine driving variable, and determine the temperature of the exhaust gas and the NOx storage catalyst 110 in consideration of a distance from an exhaust valve of the engine and a thermal capacity. The engine driving variable includes at least one of a RPM of the engine, a fuel amount, an air amount, a lambda value of the exhaust gas, a flow rate of the exhaust gas, and an ignition timing.

Figure 3:
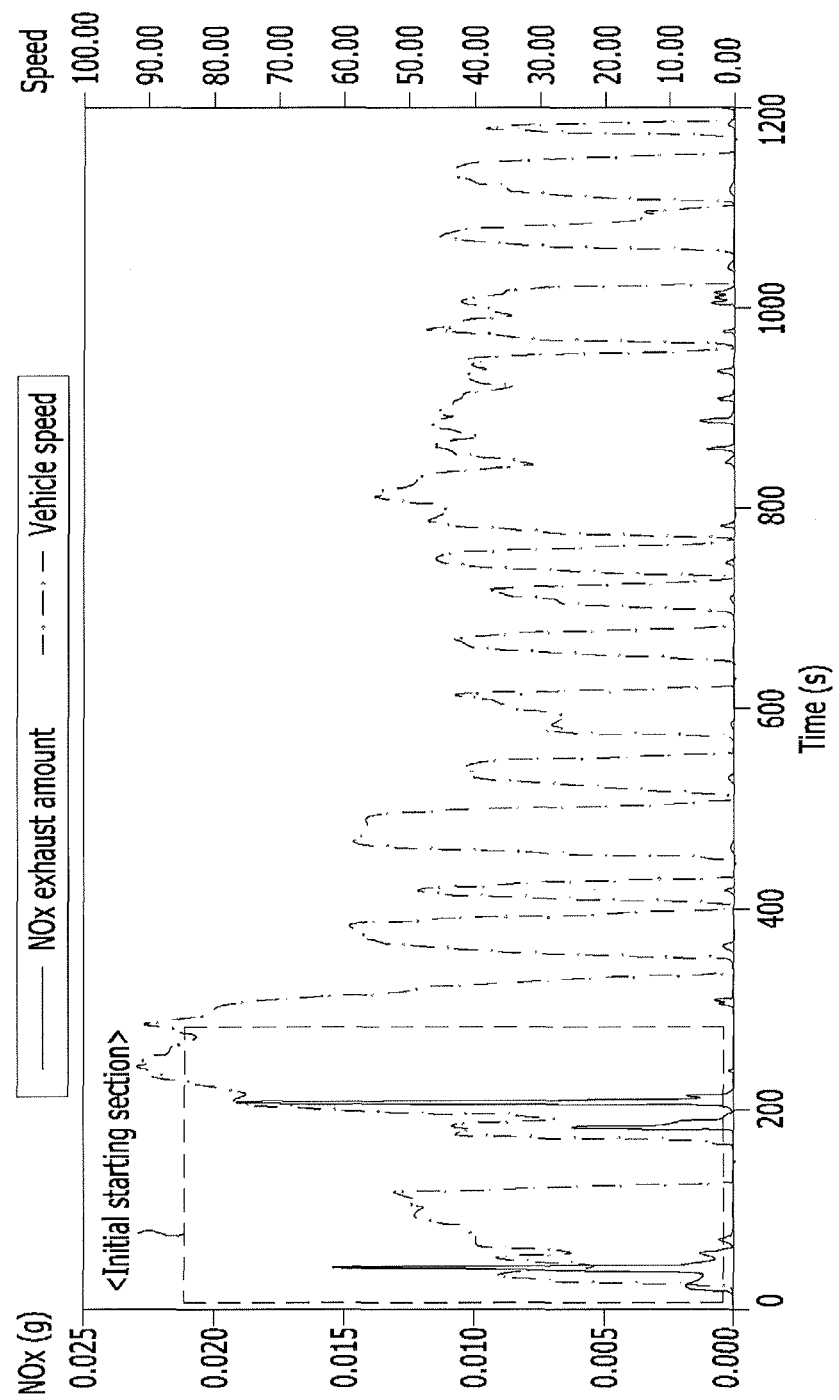
FIG. 3 is a graph of an exhausted NOx amount in an initial starting section.

FIG. 3 is a graph of an exhausted NOx amount in an initial starting section.

Referring to FIG. 3, a large amount of NOx is generated in the initial starting section of the engine of 0 to 200 seconds.

Accordingly, the device for purifying exhaust gas activates absorption of the NOx in the NOx storage catalyst 110 by increasing the temperature of the exhaust gas at step S106. The device for purifying exhaust gas may increase the temperature of the exhaust gas by increasing RPM of the engine 100 or retarding the ignition timing of the engine 100.

When the temperature of NOx storage catalyst reaches the temperature to detach the NOx, the device for purifying exhaust gas controls the exhaust gas in a rich condition and supplies a reducing agent to improve a NOx purification ratio of the three way catalyst 120.

For example, when the temperature of the NOx storage catalyst 110 is higher than the predetermined value, a NOx detaching start temperature, the device for purifying exhaust gas controls the exhaust gas in the rich condition to facilitate NOx reducing in the NOx storage catalyst 110 at steps S108 and S110. The device for purifying exhaust gas may control the lambda value of lambda sensor 130 and 140 to be less than 1.

When the temperature of the NOx storage catalyst 110 is higher than the predetermined value, a NOx detaching finish temperature, the device for purifying exhaust gas finishes the rich control and controls the lambda value to be 1 at step S112.

Figure 4:
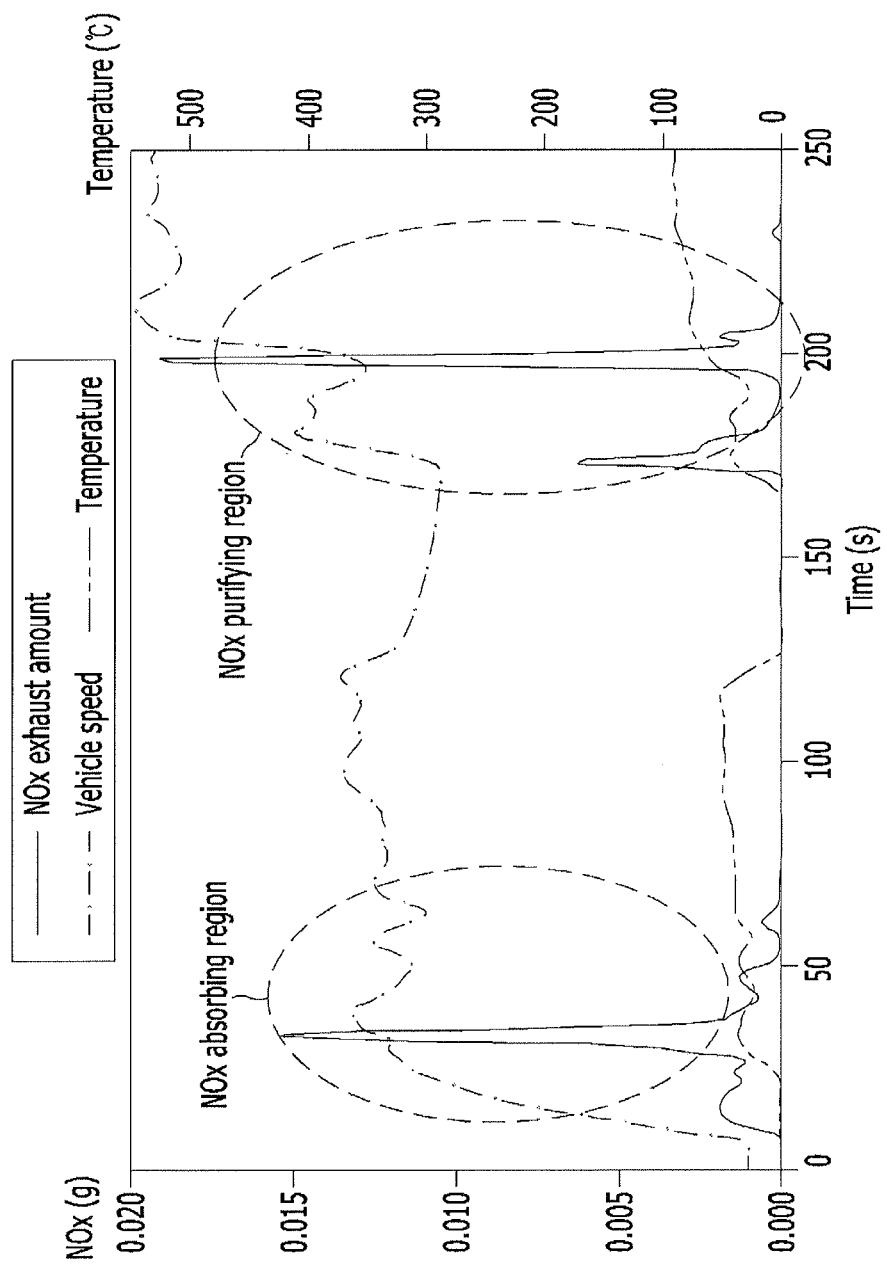
FIG. 4 is a graph of a NOx absorbing region and a NOx purifying region according to an exemplary embodiment of the present invention.
Figure 5:
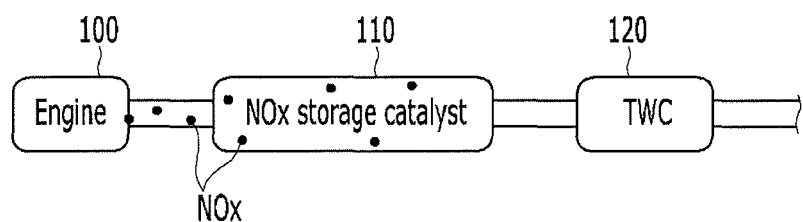
FIG. 5 is a diagram showing an example for absorbing NOx in a NOx absorbing region of FIG. 4.
Figure 6:
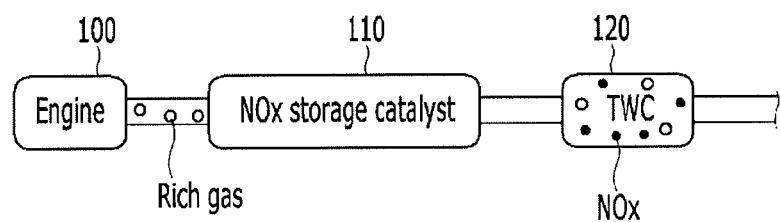
FIG. 6 is a diagram showing an example for purifying NOx in a NOx purifying region of FIG. 4.

FIG. 4 is a graph of a NOx absorbing region and a NOx purifying region according to an exemplary embodiment of the present invention, FIG. 5 is a diagram showing an example for absorbing NOx in a NOx absorbing region of FIG. 4, and FIG. 6 is a diagram showing an example for purifying NOx in a NOx purifying region of FIG. 4.

In the related art, since the NOx storage catalyst is vulnerable to high temperature, the NOx storage catalyst is disposed at the downstream side in rear of the three way catalyst. Therefore, there is a problem that the NOx storage catalyst is not controlled in a rich state even though the exhaust gas is controlled in a rich state in order to purify NOx.

However, referring FIG. 4, FIG. 5, and FIG. 6, the NOx storage catalyst is disposed at the upstream side than the three way catalyst in the device for purifying exhaust gas according to an exemplary embodiment of the present invention.

Also, in the device for purifying exhaust gas according to an exemplary embodiment of the present invention, the LTA zeolite catalyst with improved high-temperature performance is applied to the NOx storage catalyst 110. Therefore, it is possible to quickly induce NOx absorption through quickly increasing the temperature of the NOx storage catalyst 110, and quickly increase the temperature of the three way catalyst 120.

That is, in the device for purifying exhaust gas according to an exemplary embodiment of the present invention, the NOx storage catalyst 110 is disposed at the upstream side than the three way catalyst 120, therefore it is possible to minimize a reducing agent consumption by the three way catalyst 120 in the rich control. In addition, in the NOx absorbing region, NOx absorption in the NOx storage catalyst 110 is quickly induced through quickly increasing the temperature of the exhaust gas and catalyst, and the temperature of the three way catalyst 120 is quickly increased.

In NOx absorbing region, the exhaust gas is controlled in the rich state, and the NOx purification ratio of the three way catalyst 120 is improved by supplying the reducing agent. That is, the device for purifying exhaust gas according to an exemplary embodiment of the present invention activates the absorption of the nitrogen oxide in the NOx storage catalyst 110 by increasing a temperature of the exhaust gas in cold start, and improves the NOx purification ratio of the three way catalyst 120 by controlling the exhaust gas in a rich condition when the temperature of the NOx storage catalyst 110 reaches the temperature at which NOx is detached.

As such, in the device for purifying exhaust gas according to the exemplary embodiment of the present invention, the LTA zeolite catalyst with improved high temperature performance is applied to the NOx storage catalyst, and the three way catalyst is disposed in rear of the NOx storage catalyst, and thus it is possible to provide an environment that can improve the purification performance of nitrogen oxide and improve fuel economy.

Further, in the device for purifying exhaust gas according to the exemplary embodiment of the present invention, the absorption of the nitrogen oxide is activated by increasing a temperature of the exhaust gas in the cold start when a larger amount of the NOx is produced, the exhaust gas is controlled in the rich condition and the reducing agent is supplied when the temperature reaches the temperature at which NOx is detached, and thus it is possible to provide an environment that can improve the purification performance of nitrogen oxide and improve fuel economy.

While this invention has been described in connection with what is presently considered to be practical exemplary embodiments, it is to be understood that the invention is not limited to the disclosed exemplary embodiments. On the contrary, it is intended to cover various modifications and equivalent arrangements included within the spirit and scope of the appended claims.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents

What is claimed is:

1. A device for purifying exhaust gas provided to purify exhaust gas in an engine, the device comprising:
   an exhaust line through which exhaust gas discharged from the engine passes;
   a nitrogen oxide (NOx) storage catalyst that is installed in the exhaust line to absorb a nitrogen oxide discharged from the exhaust gas, and detach an absorbed nitrogen oxide when a temperature of the NOx storage catalyst is higher than a predetermined value; and
   a three way catalyst (TWC) arranged in rear of the NOx storage catalyst for reducing the nitrogen oxide detached from the NOx storage catalyst,
   wherein the NOx storage catalyst includes a Linde-Type A (LTA) zeolite catalyst,
   wherein the LTA zeolite catalyst includes a palladium (Pd), and
   wherein a content of the Pd is about 0 wt % to about 3 wt % with respect to an entire weight of the LTA zeolite catalyst.

2. The device of claim 1, further comprising:
   a controller that is configured to activate an absorption of the nitrogen oxide in the NOx storage catalyst by increasing a temperature of the exhaust gas in cold start, and control the exhaust gas in a rich condition when the temperature of the NOx storage catalyst is higher than the predetermined value.

3. The device of claim 2, wherein:
   the controller controls the exhaust gas in the rich condition by using a lambda signal of a lambda sensor when the temperature of the NOx storage catalyst is higher than the predetermined value.

4. The device of claim 2, wherein:
   the controller models the temperature of the exhaust gas according to a change of an engine driving variable, and determines the temperature of the exhaust gas and the temperature of the NOx storage catalyst in consideration of a distance from an exhaust valve of the engine and a thermal capacity.

5. The device of claim 4, wherein:
   the engine driving variable includes at least one of a RPM of the engine, a fuel amount, an air amount, a lambda value of the exhaust gas, a flow rate of the exhaust gas, and an ignition timing.

6. The device of claim 2, wherein:
   the controller increases the temperature of the exhaust gas by increasing a RPM of the engine in the cold start.

7. The device of claim 1, wherein:
the LTA zeolite catalyst further includes at least one of platinum (Pt), rhodium (Rh), iron (Fe), copper (Cu), silver (Ag), manganese (Mn), cobalt (Co) and magnesium (Mg).

8. A method for purifying an exhaust gas in an engine by a device for purifying exhaust gas, the method comprising:
measuring a temperature of the exhaust gas and a temperature of a NOx storage catalyst;
increasing the temperature of the exhaust gas to absorb a nitrogen oxide in the NOx storage catalyst; and
controlling the exhaust gas in a rich condition when the temperature of the NOx storage catalyst is higher than a predetermined value,
wherein the NOx storage catalyst includes an LTA zeolite catalyst,
wherein the LTA zeolite catalyst includes a palladium (Pd), and
wherein a content of the Pd is about 0.1 wt % to about 3 wt % with respect to an entire weight of the LTA zeolite catalyst.

9. The method of claim 8, wherein:
the LTA zeolite catalyst further includes at least one of Pt, Rh, Fe, Ag, Mn, Co and Mg.

10. The method of claim 8, wherein the measuring the temperature includes:
modeling the temperature of the exhaust gas according to a change of an engine driving variable, and determining the temperature of the exhaust gas and the temperature of the NOx storage catalyst in consideration of a distance from an exhaust valve of the engine and a thermal capacity.

11. The method of claim 10, wherein:
the engine driving variable includes at least one of a RPM of the engine; a fuel amount, an air amount, a lambda value of the exhaust gas, a flow rate of the exhaust gas, and an ignition timing.

12. The method of claim 8, wherein the increasing the temperature of the exhaust gas includes:
increasing the temperature of the exhaust gas by increasing a RPM of the engine in a cold start, and activating an absorption of the nitrogen oxide in the NOx storage catalyst.

13. The method of claim 8, wherein:
the controlling the exhaust gas in the rich condition controls a lambda value detected from a lambda sensor to be smaller than 1, and purifies the nitrogen oxide detached from the NOx storage catalyst by a three way catalyst (TWC) arranged in rear of the NOx storage catalyst.

* * * * *